//

3,080,387
1',1'-DIHALO AND 1'-CARBOXY-CYCLOPROPANO-ANDROSTENE DERIVATIVES

Lawrence H. Knox, Mexico City, Mexico, assignor to Syntex S.A., Mexico City, Mexico, a corporation of Mexico
No Drawing. Filed Apr. 13, 1962, Ser. No. 187,223
20 Claims. (Cl. 260—397.1)

The present invention relates to novel cyclopentanophenanthrene derivatives and to a process for the production thereof.

More specifically the present invention relates to novel

1',1'-dichlorocyclopropano-(2',3';3α,4α)-Δ⁵-androsten-17β-ol;
1',1'-dichlorocyclopropano-(2',3';5β,6β)-Δ³-androsten-17β-ol;
1',1'-difluorocyclopropano-(2',3';3α,4α)-Δ⁵-androsten-17β-ol;
1',1'-difluorocyclopropano-(2',3';5β,6β)-Δ³-androsten-17β-ol;
1'-carboxycyclopropano-(2',3';3α,4α)-Δ⁵-androsten-17β-ol;
1'-carboxycyclopropano-(2',3';5β,6β)-Δ³-androsten-17β-ol;
cyclopropano-(1',2';3α,4α)-Δ⁵-androsten-17β-ol and cyclopropano-(1',2';5β,6β)-Δ³-17β-ol derivatives and to the 19-nor-derivatives thereof.

The novel compounds of the present invention are represented by the following formulas:

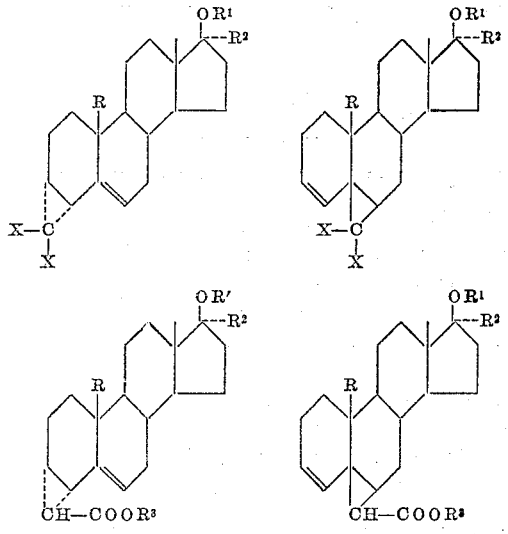

In the above formulas X represents hydrogen, fluorine or chlorine; R represents hydrogen or methyl; R¹ may be hydrogen or a hydrocarbon carboxylic acyl group of less than 12 carbon atoms; R² indicates hydrogen, lower alkynyl or lower alkyl; R³ represents hydrogen or lower alkyl.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are agents with a favorable anabolic-androgenic ratio, exhibit anti-ovulatory and anti-estrogenic properties and inhibit the pituitary gland.

The novel compounds of the present invention are prepared in accordance with the following equation:

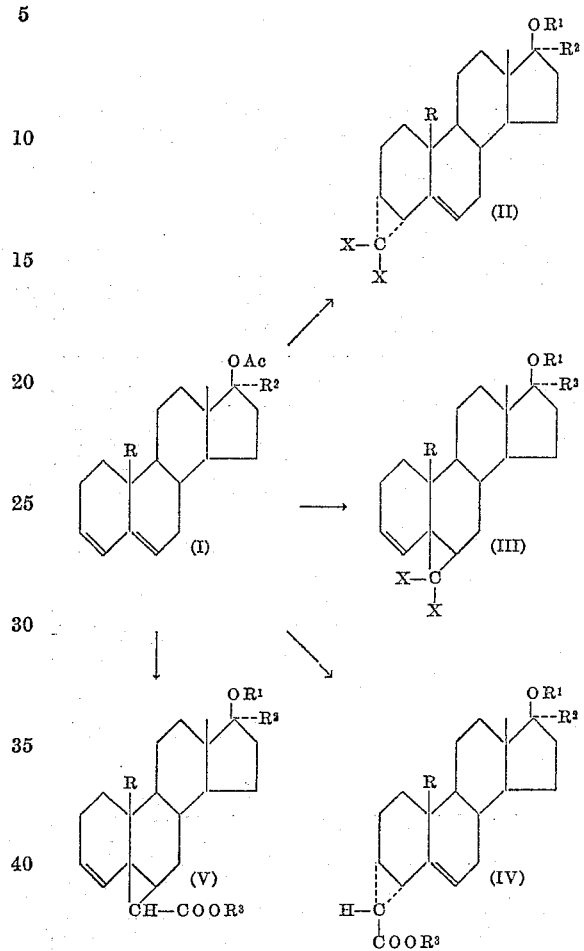

In the above formulas X, R, R¹ and R² have the same meaning as previously defined; Ac represents an acyl group, preferably the acetyl group.

The starting compound (I) of the above outlined process is prepared from the corresponding testosterone derivative by sodium borohydride or lithium aluminum hydride reduction, followed by reflux of the produced 3-hydroxy1Δ⁴-derivative with 50% acetic acid and conventional acylation of the obtained Δ³,⁵-androstadien-17β-ol. The said starting compound is selected from the group consisting of the 17-acylates of Δ³,⁵-androstadien-17β-ol, 17α-lower alkyl-Δ³,⁵-androstadien-17β-ol, 17α-lower alkynyl-Δ³,⁵-androstadien-17β-ol and the 19-nor derivatives thereof.

In accordance with the above equation, the starting compound (I) is treated with an alkali metal trichloroacetate, preferably the sodium salt, in a suitable solvent such as bis-(2-methoxyethyl)-ether at approximately 125° C. for a period of time of the order of 1.5 hours and the product thus obtained is chromatographed, for example on Florisil, thus affording the corresponding 1',1'-dichlorocyclopropano-(2',3';3α,4α) - Δ⁵ - androsten-17β-ol (II; X=Cl) and 1',1'-dichlorocyclopropano-(2',3'; 5β,6β)-Δ⁵-androsten-17β-ol (III; X=Cl) derivatives.

Upon treatment of the starting compound (I) with diazomethane in the presence of copper powder followed by chromatography of the resulting product, there are obtained the corresponding cyclopropano-(1',2';3α,4α)-

$\Delta^5$-androsten-17$\beta$-ol- (II; X=H) and cyclopropano-(1', 2';5$\beta$,6$\beta$)-$\Delta^3$-androsten-17$\beta$-ol (III; X=H) derivatives.

Upon reaction of the starting compound (I) with an alkali metal monochloro difluoro acetate, preferably sodium monochloro difluoro acetate, in a suitable solvent such as diglyme at reflux temperature, for a period of time of the order of 20 minutes, followed by chromatography of the resulting product, there are produced the corresponding 1',1-difluorocyclopropano - (2',3';3$\alpha$,4$\alpha$)-$\Delta^5$-androsten-17$\beta$-ol (II; X=F) and 1',1-difluorocyclopropano - (2',3';5$\beta$,6$\beta$)-$\Delta^3$-androsten-17$\beta$-ol (III; X=F) derivatives.

The reaction of the starting compound (I) with a lower alkyl diazoacetate such as ethyl diazoacetate, in the presence of copper powder, in a suitable solvent such as 1,2-dimethoxy-ethane, at reflux temperature and for a period of time of the order of four and a half hours, yields a product which upon chromatography is separated into the corresponding 1'-carbethoxycyclopropano-(2',3'; 2$\alpha$,4$\alpha$)-$\Delta^5$-androsten-17$\beta$-ol (IV; R$^3$=ethyl) and 1'-carbethoxycyclopropano - (2',3';5$\beta$,6$\beta$)-$\Delta^3$-androsten-17$\beta$-ol- (V; R$^3$=ethyl) derivatives.

The compounds obtained hereinabove (II, III, IV, V) wherein R$^1$ is an acyl group i.e. the 17$\beta$-acyloxy derivatives, are conventionally saponified with a base to the corresponding 17$\beta$-free alcohols (II, III, IV, V; R$^1$=H) which in turn are conventionally acylated to the corresponding 17$\beta$-acylates, wherein the acyl group may be different from the previously hydrolyzed group.

In the case of the compounds represented by formulas IV and V wherein R$^3$ is a lower alkyl, the saponification with a base also hydrolyzes the said lower alkyl group, thus affording the corresponding 1'-carboxycyclopropano-(2',3';3$\alpha$,4$\alpha$)-$\Delta^5$-androsten-17$\beta$-ol (IV; R$^3$=H) and 1'-carboxycyclopropano - (2',3;5$\beta$,6$\beta$) - $\Delta^3$ - androsten - 17$\beta$-ol (V; R$^3$=H) derivatives.

The following specific examples serve to illustrate but are not intended to limit the scope of the present invention:

PREPARATION 1

A solution of 1 g. of testosterone in 50 cc. of tetrahydrofuran was added over a 30 minutes period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving $\Delta^4$-androstene-3$\beta$,17$\beta$-diol.

1 g. of the latter product was heated on the steam bath with 100 cc. of 50% acetic acid under nitrogen for 1 hour, it was then poured into water. The precipitate was collected, washed well with water, dried and recrystallized from acetone-hexane, thus furnishing $\Delta^{3,5}$-androstadien-17$\beta$-ol.

By the above procedures, 19-nor-testosterone, 17$\alpha$-ethyl-testosterone, 17$\alpha$-methyl-19-nor-testosterone, 17$\alpha$-ethinyl-testosterone and 17$\alpha$-ethinyl-19-nor-testosterone were respectively converted into 19-nor-$\Delta^{3,5}$-androstadien-17$\beta$-ol, 17$\alpha$-ethyl-$\Delta^{3,5}$-androstadien-17$\beta$-ol, 17$\alpha$-methyl-19-nor-$\Delta^{3,5}$-androstadien-17$\beta$-ol, 17$\alpha$-ethinyl-$\Delta^{3,5}$-androstadien-17$\beta$-ol and 17$\alpha$-ethinyl-19-nor-$\Delta^{3,5}$-androstadien-17$\beta$-ol.

PREPARATION 2

A mixture of 1 g. of $\Delta^{3,5}$-androstadien-17$\beta$-ol, 4 cc. of pyridine and 2 cc. of acetic anhydride was kept at room temperature overnight, poured into ice water, the formed precipitate was filtered, washed with water and dried. Crystallization from acetone-hexane gave the acetate of $\Delta^{3,5}$-androstadien-17$\beta$-ol.

By the same procedure there was treated 19-nor-$\Delta^{3,5}$-androstadien-17$\beta$-ol to produce the acetate of 19-nor-$\Delta^{3,5}$-androstadien-17$\beta$-ol.

PREPARATION 3

To a solution of 5 g. of 17$\alpha$-ethyl-$\Delta^{3,5}$-androstadien-17$\beta$-ol in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 17$\alpha$-ethyl-$\Delta^{3,5}$-androstadien-17$\beta$-ol.

Using exactly the same conditions, 17$\alpha$-methyl-19-nor-$\Delta^{3,5}$-androstadien-17$\beta$-ol, 17$\alpha$-ethinyl-19-nor-$\Delta^{3,5}$-androstadien-17$\beta$-ol and 17$\alpha$-ethinyl-$\Delta^{3,5}$-androstadien-17$\beta$-ol were transformed into the corresponding acetates.

Example I

To a solution of 2 g. of the acetate of $\Delta^{3,5}$-androstadien-17$\beta$-ol in 50 cc. of diglyme (bis(2-methoxyethyl)ether) at 125° C. there were added 4.4 g. of sodium trichloroacetate in 10 equal portions at 10 minutes intervals. The reaction mixture was then cooled, the formed sodium chloride filtered off and the filtrate evaporated to dryness under reduced pressure. The residue was conventionally chromatographed on Florisil, thus yielding two products, which upon crystallization from methanol furnished 1',1'-dichlorocyclopropano-(2',3';3$\alpha$,4$\alpha$) - $\Delta^5$-androsten - 17$\beta$ - ol - acetate and 1',1'-dichlorocyclopropano-(2',3';5$\beta$,6$\beta$) - $\Delta^3$ - androsten - 17$\beta$-ol-acetate.

Example II

The acetate of 19-nor-$\Delta^{3,5}$-androstadien-17$\beta$-ol was treated by the procedure described in Example I, to produce 1',1'-dichlorocyclopropano-(2',3';3$\alpha$,4$\alpha$)-19-nor-$\Delta^5$-androsten-17$\beta$-ol-acetate and 1',1'-dichlorocyclopropano-(2',3';5$\beta$,6$\beta$)-19-nor-$\Delta^3$-androsten-17$\beta$-ol-acetate.

Example III

The acetate of 17$\alpha$-ethyl-$\Delta^{3,5}$-androstadien-17$\beta$-ol was treated in accordance with Example I, thus furnishing 1',1' - dichloro-cyclopropano - (2',3';3$\alpha$,4$\alpha$) - 17$\alpha$ - ethyl-$\Delta^5$-androsten-17$\beta$-ol-acetate and 1',1'-dichlorocyclopropano-(2',3';5$\beta$,6$\beta$)-17$\alpha$-ethyl-$\Delta^3$-androsten-17$\beta$-ol-acetate.

Example IV

The acetate of 17$\alpha$-methyl-19-nor-$\Delta^{3,5}$-androstadien-17$\beta$-ol was treated according to Example I, thus giving 1',1'-dichlorocyclopropano - (2',3';3$\alpha$,4$\alpha$)-17$\alpha$-methyl-19-nor-$\Delta^5$-androsten-17$\beta$-ol-acetate and 1',1'-dichlorocyclopropano-(2',3';5$\beta$,6$\beta$) - 17$\alpha$ - methyl-19-nor-$\Delta^3$-androsten-17$\beta$-ol-acetate.

Example V

To a mixture of 2 g. of the acetate of $\Delta^{3,5}$-androstadien-17$\beta$-ol, 50 cc. of ether and 300 mg. of powdered copper there was cautiously added a large excess of an ethereal solution of diazomethane, dropwise and with stirring. After evolution of nitrogen had ceased, the mixture was filtered and the excess reagent was decomposed by adding, dropwise, acetic acid until the yellow color of the filtrate disappeared. The solution was then evaporated to dryness and the residue chromatographed on Florisil, thus yielding two products which upon crystallization from acetone-hexane furnished cyclopropano(1',2';3$\alpha$,4$\alpha$)-$\Delta^5$-androsten-17$\beta$-ol-acetate and cyclopropano-(1',2';5$\beta$)-$\Delta^3$-androsten-17$\beta$-ol-acetate.

Example VI

The acetate of 19-nor-$\Delta^{3,5}$-androstadien-17$\beta$-ol was treated following the procedure described in Example V, to produce cyclopropano-(1',2';3$\alpha$,4$\alpha$)-19-nor-$\Delta^5$-androsten-17β-ol-acetate and cyclopropano-(1',2'; 5β,6β)-19-nor-Δ³-androsten-17β-ol-acetate.

*Example VII*

The acetate of 17α-ethyl-Δ³,⁵-androstadien-17β-ol was treated in accordance with Example V, thus furnishing cyclopropano-(1',2';3α,4α)17α-ethyl-Δ⁵ - androsten-17β-ol-acetate and cyclopropano-(1',2'; 5β,6β)-17α-ethyl-Δ³-androsten-17β-ol-acetate.

*Example VIII*

The acetate of 17α-methyl-19-nor-Δ³,⁵- androstadien-17β-ol was treated according to Example V, thus giving cyclopropano-(1',2';3α,4α) - 17α-methyl-19-nor-Δ⁵ - androsten-17β-ol-acetate and cyclopropano-(1',2';5β,6β)-17α-methyl-19-nor-Δ³-androsten-17β-ol-acetate.

*Example IX*

A mixture of 2 g. of the acetate of Δ³,⁵-androstadien-17β-ol, 100 cc. of diglyme and 4 g. of sodium monochloro difluoro acetate was refluxed for 10 minutes, then cooled to 50° C., an additional 4 g. of the same salt were thereafter added and the resulting mixture again refluxed for 10 minutes. The reaction mixture was cooled, the formed sodium chloride filtered off and the filtrate evaporated to dryness under reduced pressure. The residue was conventionally chromatographed on Florisil, thus yielding two products, which upon crystallization from methanol furnished 1',1'-difluorocyclopropano-(2',3';3α,4α)-Δ⁵-androsten-17β-ol-acetate and 1',1'-difluoro-cyclopropano-(2',3';5β,6β)-Δ³-androsten-17β-ol-acetate.

*Example X*

The acetate of 19-nor-Δ³,⁵-androstadien-17β-ol was treated following the procedure described in Example IX, to produce 1',1'-difluorocyclopropano-(2',3';3α,4α)-19-nor-Δ⁵-androsten-17β-ol-acetate and 1',1'-difluorocyclopropano-(2',3';5β,6β) - 19 - nor - Δ³ - androsten-17β-ol-acetate.

*Example XI*

The acetate of 17α-ethyl-Δ³,⁵-androstadien-17β-ol was treated in accordance with Example IX, thus furnishing: 1',1'-difluorocyclopropano-(2',3';3α,4α)-17α- - ethyl - Δ⁵-androsten-17β-ol-acetate and 1',1'-difluorocyclopropano-(2',3';5β,6β)-17α-ethyl-Δ³-androsten-17β-ol-acetate.

*Example XII*

The acetate of 17α-methyl-19-nor-Δ³,⁵-androstadien-17β-ol was treated according to Example IX, thus giving 1',1'-difluorocyclopropano - (2',3';3α,4α) - 17α-methyl-19-nor-Δ⁵-androsten-17β-ol-acetate and 1',1'-difluoro-cyclopropano-(2',3';5β,6β)-17α-methyl-19-nor-Δ³ - androsten-17β-ol-acetate.

*Example XIII*

A mixture of 2 g. of the acetate of Δ³,⁵-androstadien-17β-ol, 20 cc. of 1,2-dimethoxy-ethane and 300 mg. of freshly prepared copper powder was heated to reflux temperature, then there was added dropwise with stirring, a solution of 3.4 g. of ethyl diazoacetate in 5 cc. of 1,2-dimethoxy-ethane over a period of 2 hours. Refluxing was continued for an additional 2.5 hours. The catalyst was thereafter filtered off and the filtrate evaporated to dryness. The residue was conventionally chromatographed on Florisil, thus yielding two products which upon crystallization from acetone-hexane furnished 1'-carbethoxy-cyclopropano(2',3';3α,4α)-Δ⁵ - androsten-17β-ol-acetate and 1'-carbethoxy-cyclopropano-(2',3';5β,6β)-Δ³-androsten-17β-ol-acetate.

*Example XIV*

The acetate of 19-nor-Δ³,⁵-androstadien-17β-ol was treated following the procedure described in Example XIII, to produce 1'-carbethoxy-cyclopropano-(2',3';3α,4α)-19-nor-Δ⁵-androsten-17β-ol-acetate and 1'-carbethoxy-cyclopropano-(2',3';5β,6β) - 19 - nor-Δ³-androsten-17β-ol-acetate.

*Example XV*

The acetate of 17α-ethyl-Δ³,⁵-androstadien-17β-ol was treated in accordance with Example XIII, thus furnishing 1' - carbethoxy-cyclopropano-(2',3';3α,4α)-17α-ethyl-Δ⁵-androsten-17β-ol-acetate and 1'-carbethoxy-cyclopropano-(2',3';5β,6β)-17α-ethyl-Δ³-androsten-17β-ol-acetate.

*Example XVI*

The acetate of 17α-methyl-19-nor-Δ³,⁵-androstadien-17β-ol was treated according to Example XIII, thus giving 1'-carbethoxy-cyclopropano-(2',3';3α,4α)-17α-methyl-19-nor-Δ⁵-androsten - 17β - ol-acetate and 1'-carbethoxy-cyclopropano - (2',3';5β,6β) - 17α - methyl-19-nor-Δ³-androsten-17β-ol-acetate.

*Example XVII*

A solution of 0.17 g. of potassium hydroxide in 0.2 cc. of water and 2.5 cc. of methanol was added over 30 minutes to a boiling solution of 1 g. of 1',1'-dichloro-cyclopropano-(2',3';3α,4α)-Δ⁵-androsten-17β-ol-acetate in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 1',1'-dichloro-cyclopropano-(2',3';3α,4α)-Δ⁵-androsten-17β-ol.

Using exactly the same conditions, the starting compound, listed under I were transformed into the corresponding products set forth under II.

| I | II |
|---|---|
| 1',1'-dichloro-cyclopropano-(2',3';3α,4α)-19-nor-Δ⁵-androsten-17β-ol-acetate. | 1',1'-dichloro-cyclopropano-(2',3';3α,4α)-19-nor-Δ⁵-androsten-17β-ol. |
| 1',1'-dichloro-cyclopropano-(2',3';3α,4α)-17α-ethyl-Δ⁵-androsten-17β-ol-acetate. | 1',1'-dichloro-cyclopropano-(2',3';3α,4α)-17α-ethyl-Δ⁵-androsten-17β-ol. |
| 1',1'-dichloro-cyclopropano-(2',3';3α,4α)-17α-methyl-19-nor-Δ⁵-androsten-17β-ol-acetate. | 1',1'-dichloro-cyclopropano-(2',3';3α,4α)-17α-methyl-19-nor-Δ⁵-androsten-17β-ol. |
| 1',1'-dichloro-cyclopropano-(2',3';5β,6β)-Δ³-androsten-17β-ol-acetate. | 1',1'-dichloro-cyclopropano-(2',3';5β,6β)-Δ³-androsten-17β-ol. |
| 1',1'-dichloro-cyclopropano-(2',3';5β,6β)-19-nor-Δ³-androsten-17β-ol-acetate. | 1',1'-dichloro-cyclopropano-(2',3';5β,6β)-19-nor-Δ³-androsten-17β-ol. |
| 1',1'-dichloro-cyclopropano-(2',3';5β,6β)-17α-ethyl-Δ³-androsten-17β-ol-acetate. | 1',1'-dichloro-cyclopropano-(2',3';5β,6β)-17α-ethyl-Δ³-androsten-17β-ol. |
| 1',1'-dichloro-cyclopropano-(2',3';5β,6β)-17α-methyl-19-nor-Δ³-androsten-17β-ol-acetate. | 1',1'-dichloro-cyclopropano-(2',3';5β,6β)-17α-methyl-19-nor-Δ³-androsten-17β-ol. |
| 1',1'-difluoro-cyclopropano (2',3';3α,4α)-Δ⁵-androsten-17β-ol-acetate. | 1',1'-difluoro-cyclopropano-(2',3';3α,4α)-Δ⁵-androsten-17β-ol. |
| 1',1'-difluoro-cyclopropano (2',3';3α,4α)-17α-methyl-19-nor-Δ⁵-androsten-17β-ol-acetate. | 1',1'-difluoro-cyclopropano-(2',3';3α,4α)-17α-methyl-19-nor-Δ⁵-androsten-17β-ol. |
| 1',1'-difluoro-cyclopropano (2',3';5β,6β)-19-nor-Δ³-androsten-17β-ol-acetate. | 1',1'-difluoro-cyclopropano-(2',3';5β,6β)-19-nor-Δ³-androsten-17β-ol. |
| 1',1'-difluoro-cyclopropano (2',3';5β,6β)-17α-ethyl-Δ³-androsten-17β-ol-acetate. | 1',1'-difluoro-cyclopropano-(2',3';5β,6β)-17α-ethyl-Δ³-androsten-17β-ol. |
| cyclopropano-(1',2';3α,4α)-Δ⁵-androsten-17β-ol-acetate. | cyclopropano-(1',2';3α,4α)-Δ⁵-androsten-17β-ol. |
| cyclopropano-(1',2';3α,4α) 17α-methyl-19-nor-Δ⁵-androsten-17β-ol-acetate. | cyclopropano-(1',2';3α,4α)-17α-methyl-19-nor-Δ⁵-androsten-17β-ol. |
| cyclopropano-(1',2';5β,6β) 19-nor-Δ³-androsten-17β-ol-acetate. | cyclopropano-(1',2';5β,6β)-19-nor-Δ³-androsten-17β-ol. |
| cyclopropano-(1',2';5β,6β) 17α-ethyl-Δ³-androsten-17β-ol acetate. | cyclopropano-(1',2';5β,6β)-17α-ethyl-Δ³-androsten-17β-ol. |
| 1'-carbethoxy-cyclopropano (2',3';3α,4α)-Δ⁵-androsten-17β-ol-acetate. | 1'-carboxy-cyclopropano-(2',3';3α,4α)-Δ⁵-androsten-17β-ol. |
| 1'-carbethoxy-cyclopropano (2',3';3α,4α)-17α-methyl-19-nor-Δ⁵-androsten-17β-ol-acetate. | 1'-carboxy-cyclopropano (2',3';3α,4α)-17α-methyl-19-nor-Δ⁵-androsten-17β-ol. |
| 1'-carbethoxy-cyclopropano (2',3';5β,6β)-19-nor-Δ³-androsten-17β-ol-acetate. | 1'-carboxy-cyclopropano-(2',3';5β,6β)-19-nor-Δ³-androsten-17β-ol. |
| 1'-carbethoxy-cyclopropano (2',3';5β,6β)-17α-ethyl-Δ³-androsten-17β-ol-acetate. | 1'-carboxy-cyclopropano (2',3';5β,6β)-17α-ethyl-Δ³-androsten-17β-ol. |

Example XVIII

A mixture of 1 g. of 1',1'-dichloro-cyclopropano-(2',3';3α,4α)-Δ⁵-androsten-17β-ol 4 cc. of pyridine and 2 cc. of caproic anhydride was kept at room temperature overnight, poured into ice water, the formed precipitate was filtered, washed with water and dried. Crystallization from acetone-hexane gave 1',1'-dichloro-cyclopropano-(2',3';3α,4α)-Δ⁵-androsten-17β-ol-caproate.

By the same procedure, 1',1'-dichloro-cyclopropano (2',3';3α,4α)-19-nor-Δ⁵-androsten-17β-ol and 1',1'-difluoro-cyclopropano - (2',3';5β,6β) - 19 - nor - Δ³ - androsten-17β-ol were converted into the respective caproates.

Example XIX

To a solution of 5 g. of 1',1'-dichloro-cyclopropano-(2',3';3α,4α)-17α-ethyl-Δ⁵-androsten-17β-ol in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 1',1' - dichloro - cyclopropano - (2',3';3α,4α) - 17α - ethyl-Δ⁵-androsten-17β-ol-propionate.

Using exactly the same conditions 1',1'-difluoro-cyclopropano - (2',3';3α,4α) - 17α - methyl - 19 - nor - Δ⁵-androsten-17β-ol, cyclopropano-(1',2';3α,4α)-17α-methyl-19-nor-Δ⁵-androsten-17β-ol and 1'-carboxy-cyclopropano-(2',3';5β,6β)-17α-ethyl-Δ³-androsten-17β-ol, were converted into the corresponding propionates.

Example XX

The acetate of 17α-ethinyl-19-nor-Δ³,⁵-androstadien-17β-ol was treated by the procedure described in Example I, to produce: 1',1' - dichloro-cyclopropano-(2',3';3α,4α)-17α-ethinyl-19-nor-Δ⁵-androsten-17β-ol-acetate and 1',1'-dichloro - cyclopropano - (2',3';5β,6β) - 17α - ethinyl - 19-nor-Δ³-androsten-17β-ol-acetate.

Example XXI

The acetate of 17α-ethinyl-19-nor-Δ³,⁵-androstadien-17β-ol was treated in accordance with Example V, thus furnishing: cyclopropanol-(1',2';3α,4α)-17α-ethinyl-19-nor-Δ⁵-androsten-17β-ol-acetate and cyclopropano-(1',2';5β,6β)-17α-ethinyl-19-nor-Δ³-androsten-17β-ol-acetate.

Example XXII

The acetate of 17α-ethinyl-19-nor-Δ³,⁵-androstadien-17β-ol was treated according to Example IX thus giving: 1',1'-difluoro - cyclopropano - (2',3';3α,4α) - 17α - ethinyl - 19-nor-Δ⁵-androsten-17β-ol-acetate and 1',1'-difluoro-cyclopropano - (2',3';5β,6β) - 17α - ethinyl - 19 - nor - Δ³-androsten-17β-ol-acetate.

Example XXIII

The acetate of 17α-ethinyl-19-nor-Δ³,⁵-androstadien-17β-ol was treated following the procedure described in Example XIII, to give: 1'-carbethoxy-cyclopropano-(2',3';3α,4α)-17α-ethinyl-19-nor-Δ⁵-androsten-17β-ol-acetate and 1'-carbethoxy - cyclopropano - (2',3';5β,6β) - 17α - ethinyl-19-nor-Δ³-androsten-17β-ol-acetate.

Example XXIV

The acetate of 17α-ethinyl-Δ³,⁵-androstadien-17β-ol was treated by the procedure described in Example I, to produce: 1',1' - dichloro - cyclopropano - (2',3';3α,4α)-17α-ethinyl-Δ⁵-androsten-17β-ol-acetate and 1',1'-dichlorocyclopropanol - (2',3';5β,6β) - 17α - ethinyl-Δ³-androsten-17β-ol-acetate.

Example XXV

The acetate of 17α-ethinyl-Δ³,⁵-androstadien-17β-ol was treated in accordance with Example V, thus furnishing: cyclopropano - (1',2';3α,4α) - 17α - ethinyl - Δ⁵ - androsten-17β-ol-acetate and cyclopropano-(1',2';5β,6β)-17α-ethinyl-Δ³-androsten-17β-ol-acetate.

Example XXVI

The acetate of 17α-ethinyl-Δ³,⁵-androstadien-17β-ol was treated according to Example IX thus giving 1',1'-difluoro-cyclopropano - (2',3';3α,4α) - 17α - ethinyl - Δ⁵ - androsten-17β-ol-acetate and 1',1'-difluoro-cyclopropano-(2',3'; 5β,6β)-17α-ethinyl-Δ³-androsten-17β-ol-acetate.

Example XXVII

The acetate of 17α-ethinyl-Δ³,⁵-androstadien-17β-ol was treated following the procedure described in Example XIII, to give: 1'-carbethoxy-cyclopropano-(2',3';3α,4α)-17α-ethinyl-Δ⁵-androsten-17β-ol-acetate and 1'-carbethoxy-cyclopropano - (2',3';5β,6β) - 17α - ethinyl - Δ³ - androsten-17β-ol-acetate.

Example XXVIII

The final compounds of Examples XX, XXI, XXII, XXIV, XXV and XXVI were treated in accordance with Example XVII, thus yielding the corresponding 17β-free-alcohols.

Example XXIX

1' - carbethoxy - cyclopropano - (2',3';3α,4α) - 17α-ethinyl-19-nor-Δ⁵-androsten-17β-ol-acetate, 1'-carbethoxy-cyclopropano - (2',3';5β,6β) - 17α - ethinyl - 19 - nor - Δ³-androsten-17β-ol-acetate, 1'-carbethoxy-cyclopropano-(2', 3';3α,4α)-17α-ethinyl-Δ⁵-androsten-17β-ol-acetate and 1'-carbethoxy - cyclopropano - (2',3';5β,6β) - 17α - ethinyl-Δ³-androsten-17β-ol-acetate, were treated according to Example XVII thus giving respectively: 1'-carboxy-cyclopropano - (2',3';3α,4α) - 17α - ethinyl - 19 - nor - Δ⁵ - androsten-17β-ol, 1' - carboxy-cyclopropano-(2',3';5β,6β)-17α-ethinyl-19-nor-Δ³-androsten-17β-ol, 1'-carboxy-cyclopropano - (2',3';3α,4α) - 17α - ethinyl - Δ⁵ - androsten - 17β-ol and 1'-carboxy-cyclopropano-(2',3';5β,6β)-17α-ethinyl-Δ³-androsten-17β-ol.

I claim:
1. A compound of the following formula:

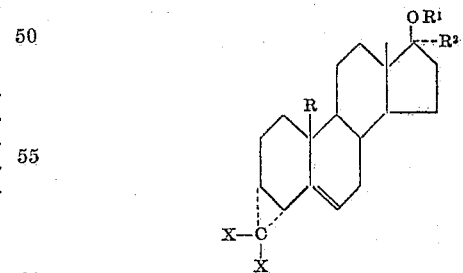

wherein R is selected from the group consisting of hydrogen and methyl; $R^1$ is a member of the group consisting of hydrogen and a hydrocarbon carboxylic acyl group of less than 12 carbon atoms; $R^2$ is selected from the group consisting of hydrogen, a lower alkyl group and a lower alkynyl group; and X is selected from the group consisting of hydrogen, fluorine and chlorine.

2. 1',1' - dichlorocyclopropano - (2',3';3α,4α) - Δ⁵ - androsten-17β-ol.

3. 1',1' - difluorocyclopropano - (2',3';3α,4α) - Δ⁵ - androsten-17β-ol.

4. Cyclopropano-(1',2';3α,4α)-Δ⁵-androsten-17β-ol.

5. Cyclopropano - (1',2';3α,4α) - 19 - nor - Δ⁵ - androsten-17β-ol.

6. A compound of the following formula:

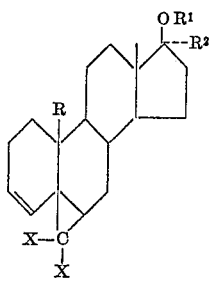

wherein R is selected from the group consisting of hydrogen and methyl; $R^1$ is a member of the group consisting of hydrogen and a hydrocarbon carboxylic acyl group of less than 12 carbon atoms; $R^2$ is selected from the group consisting of hydrogen, a lower alkyl group and a lower alkynyl group; and X is selected from the group consisting of hydrogen, fluorine and chlorine.

7. 1',1' - dichlorocyclopropano - (2',3';5β,6β) - Δ³ - androsten-17β-ol.

8. 1',1' - difluorocyclopropano - (2',3';5β,6β) - Δ³ - androsten-17β-ol.

9. Cyclopropano-(1',2';5β,6β)-Δ³-androsten-17β-ol.

10. Cyclopropano - (1',2';5β,6β) - 19 - nor - Δ³-androsten-17β-ol.

11. A compound of the following formula:

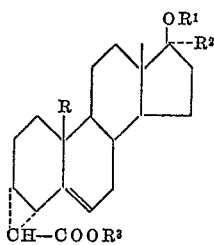

wherein R is selected from the group consisting of hydrogen and methyl; $R^1$ is a member of the group consisting of hydrogen and a hydrocarbon carboxylic acyl group of less than 12 carbon atoms; $R^2$ is selected from the group consisting of hydrogen, a lower alkyl group and a lower alkynyl group; and $R^3$ is selected from the group consisting of hydrogen and a lower alkyl group.

12. The acetate of 1'-carbethoxycyclopropano-(2',3'; 3α,4α)-Δ⁵-androsten-17β-ol.

13. The acetate of 1'-carbethoxycyclopropano-(2',3'; 3α,4α)-19-nor-Δ⁵-androsten-17β-ol.

14. 1' - carboxycyclopropano - (2',3';3α,4α) - Δ⁵ - androsten-17β-ol.

15. 1' - carboxycyclopropano - (2',3';3α,4α) - 19 - nor-Δ⁵-androsten-17β-ol.

16. A compound of the following formula:

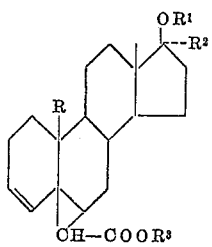

wherein R is selected from the group consisting of hydrogen and methyl; $R^1$ is a member of the group consisting of hydrogen and a hydrocarbon carboxylic acyl group of less than 12 carbon atoms; $R^2$ is selected from the group consisting of hydrogen, a lower alkyl group and a lower alkynyl group; $R^3$ is selected from the group consisting of hydrogen and a lower alkyl group.

17. The acetate of 1'-carbethoxycyclopropano-(2',3'; 5β,6β)-Δ³-androsten-17β-ol.

18. The actetate of 1'-carbethoxycyclopropano-(2',3'; 5β,6β)-19-nor-Δ³-androsten-17β-ol.

19. 1' - carboxycyclopropano - (2',3';5β,6β) - Δ³ - androsten-17β-ol.

20. 1' - carboxycyclopropano - (2',3';5β,6β) - 19 - nor-Δ³-androsten-17β-ol.

No references cited.